June 24, 1930.  E. H. GUILFORD  1,766,378
METHOD OF LOCATING UNKNOWN CONDUCTIVE BODIES
Filed April 11, 1927  7 Sheets-Sheet 1
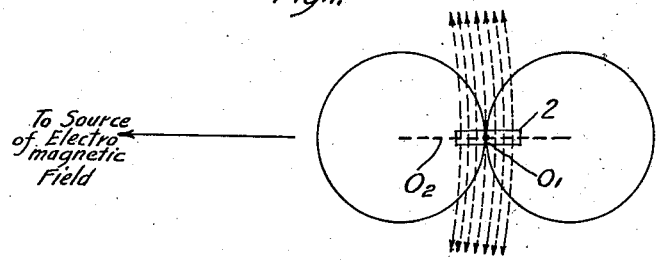
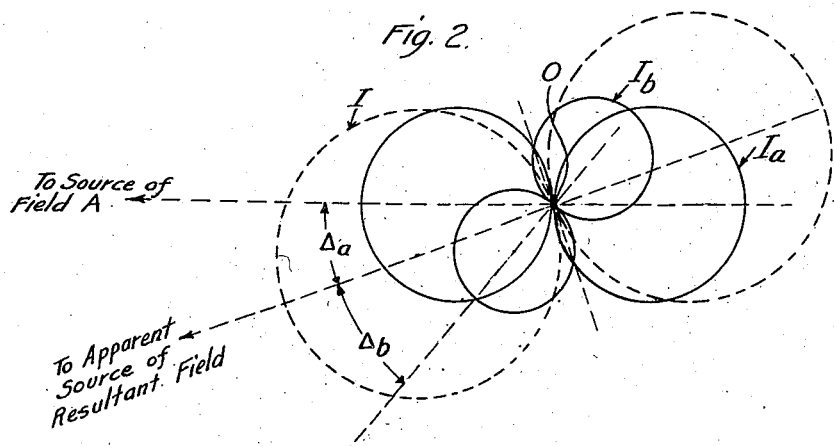
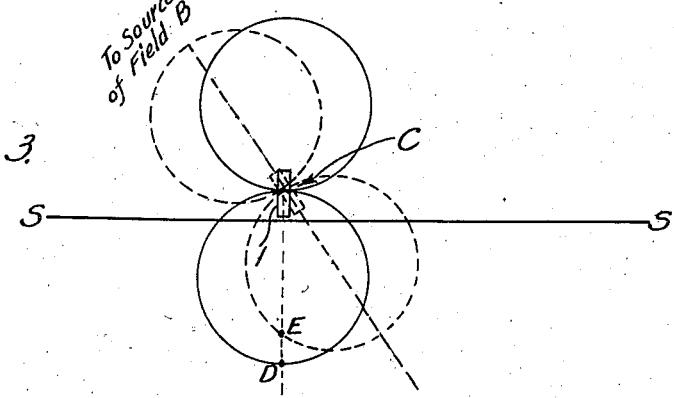
INVENTOR.
Edward H. Guilford
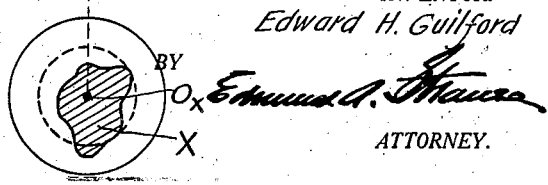
ATTORNEY.

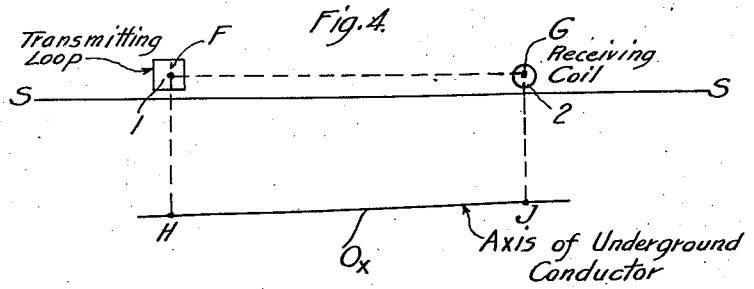
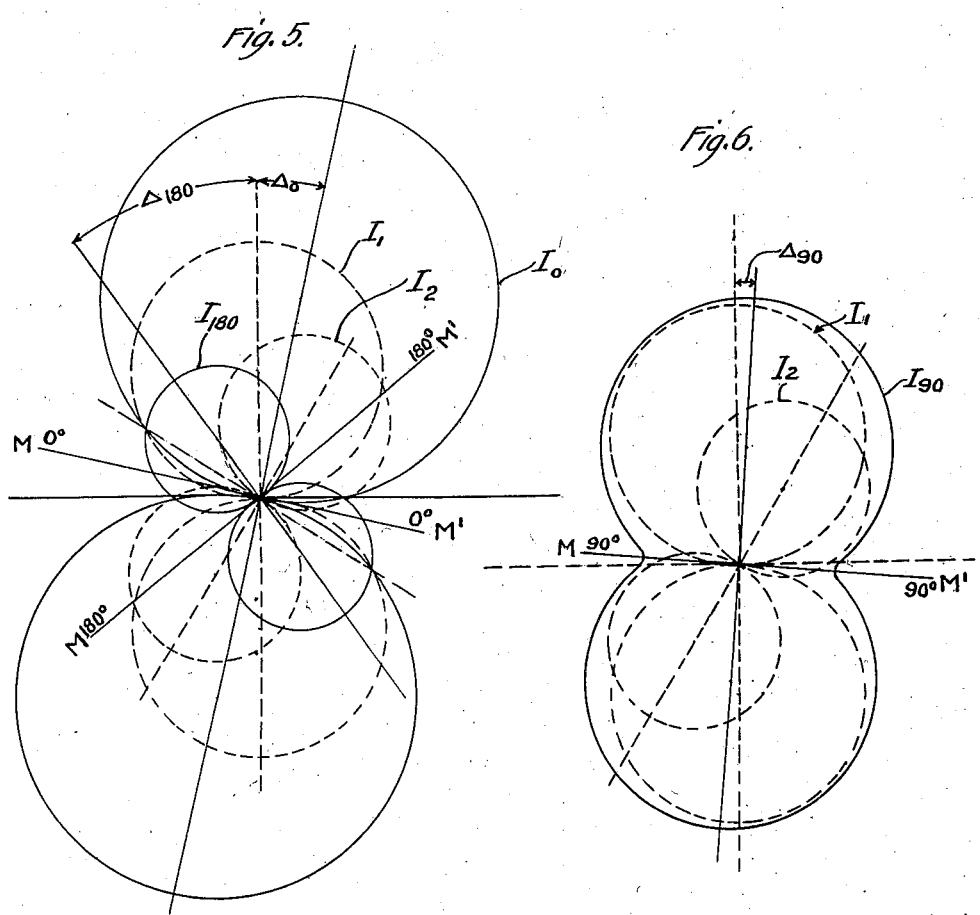

June 24, 1930.   E. H. GUILFORD   1,766,378
METHOD OF LOCATING UNKNOWN CONDUCTIVE BODIES
Filed April 11, 1927   7 Sheets-Sheet 3
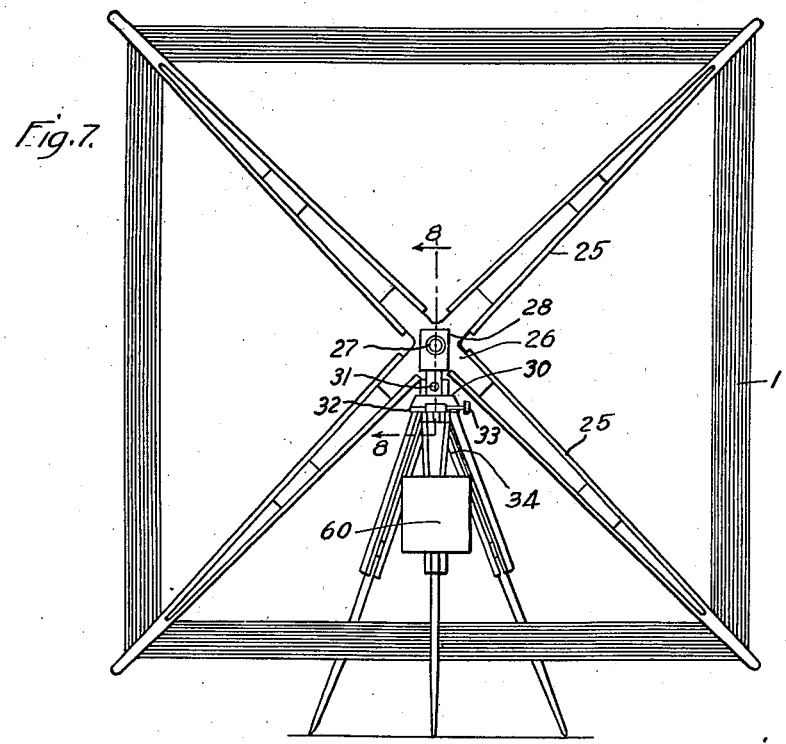
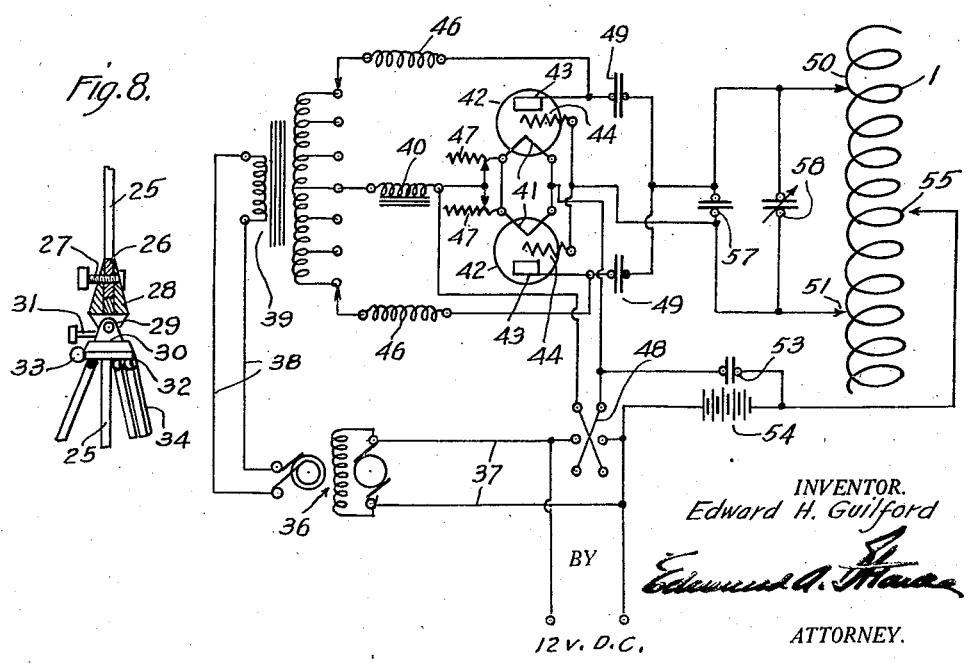
INVENTOR.
Edward H. Guilford
BY
ATTORNEY.

June 24, 1930.　　　E. H. GUILFORD　　　1,766,378
METHOD OF LOCATING UNKNOWN CONDUCTIVE BODIES
Filed April 11, 1927　　　7 Sheets-Sheet 4
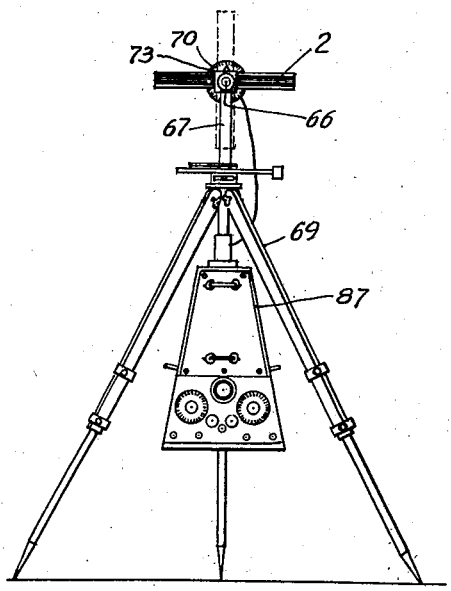
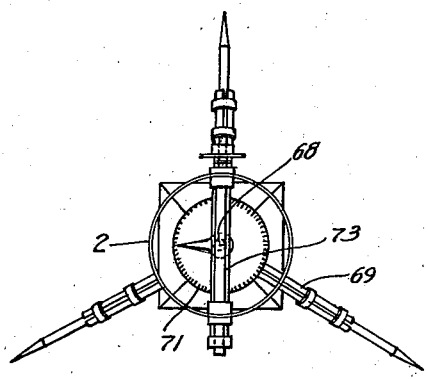
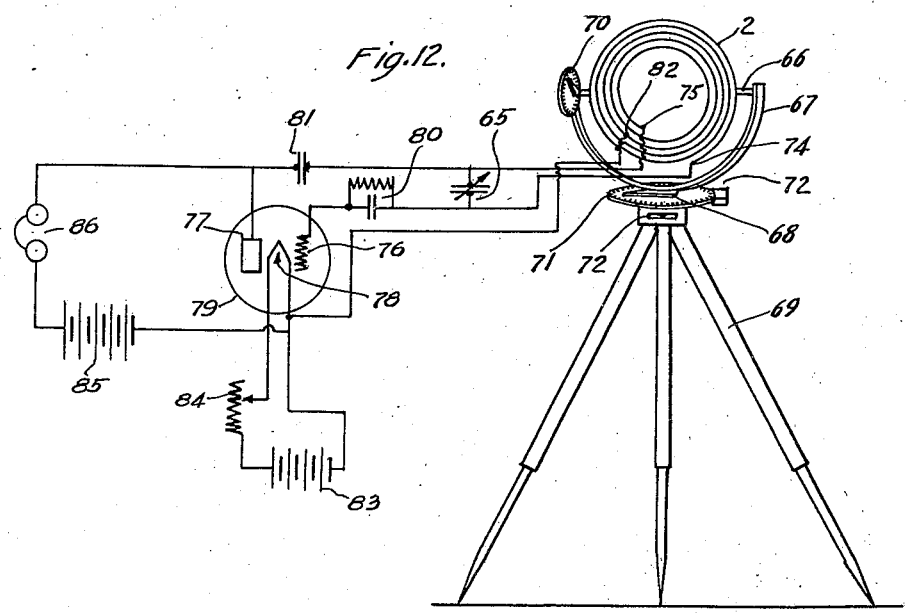
INVENTOR.
Edward H. Guilford
BY
ATTORNEY.

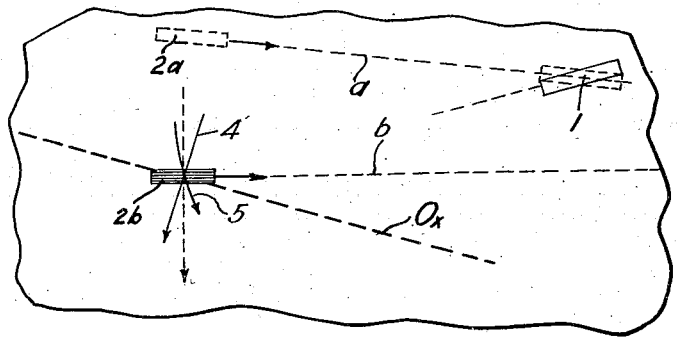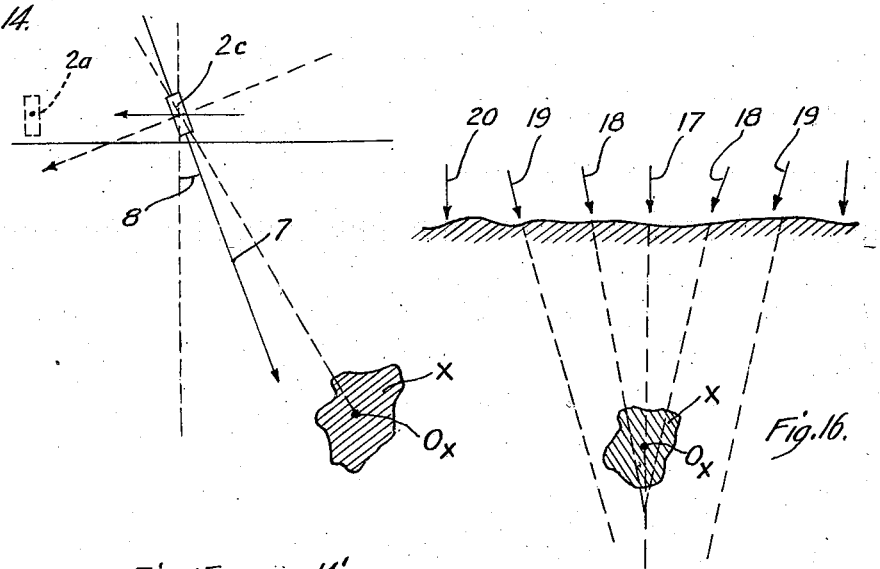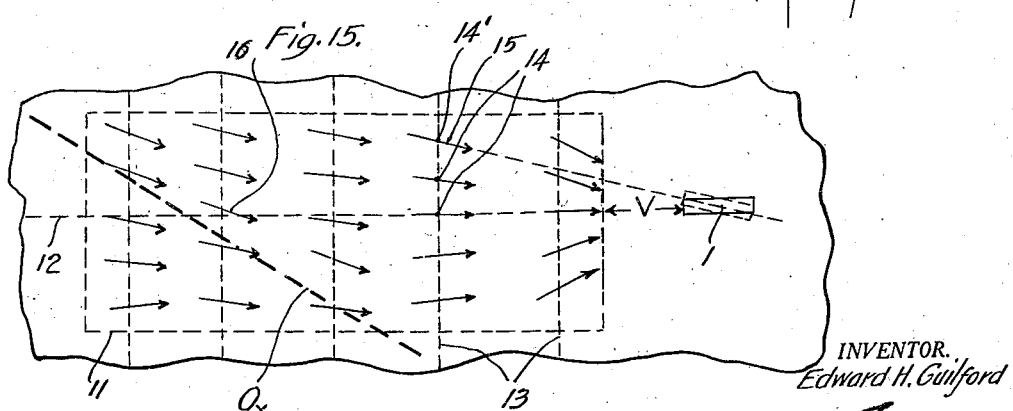

June 24, 1930.  E. H. GUILFORD  1,766,378
METHOD OF LOCATING UNKNOWN CONDUCTIVE BODIES
Filed April 11, 1927  7 Sheets-Sheet 6
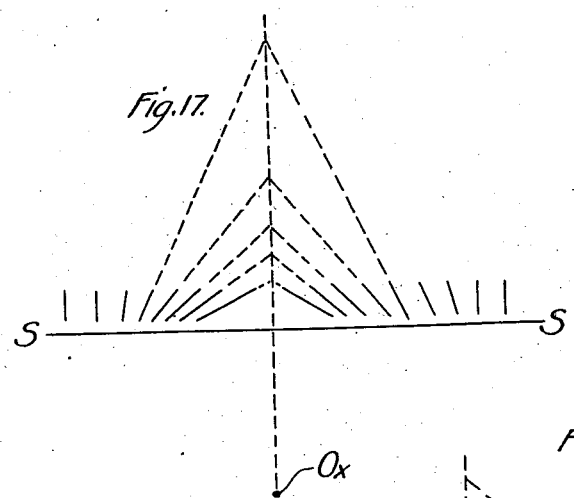
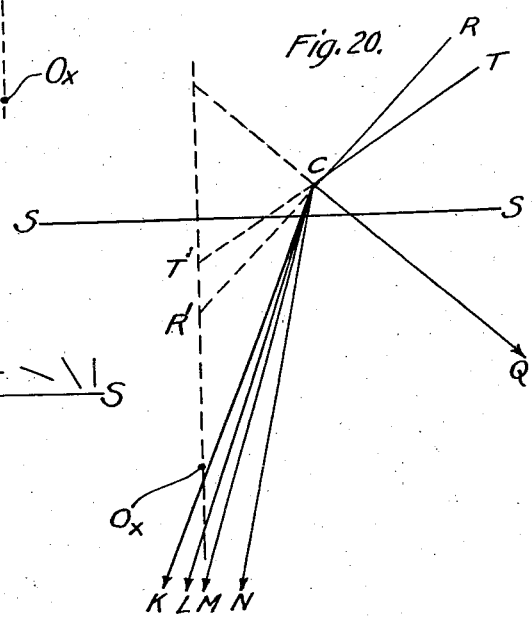
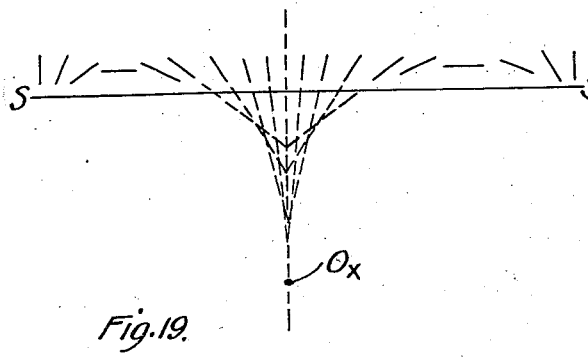
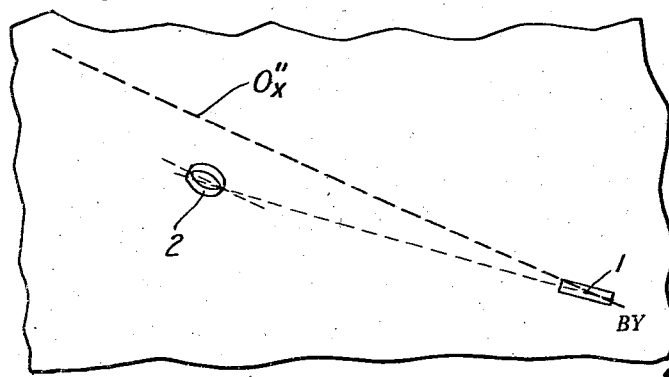
INVENTOR.
Edward H. Guilford
BY
ATTORNEY.

June 24, 1930.  E. H. GUILFORD  1,766,378
METHOD OF LOCATING UNKNOWN CONDUCTIVE BODIES
Filed April 11, 1927  7 Sheets-Sheet 7
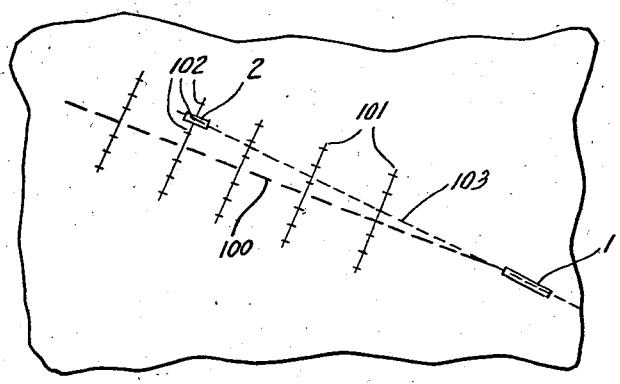
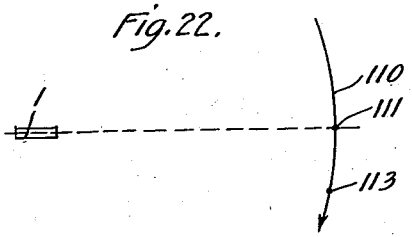
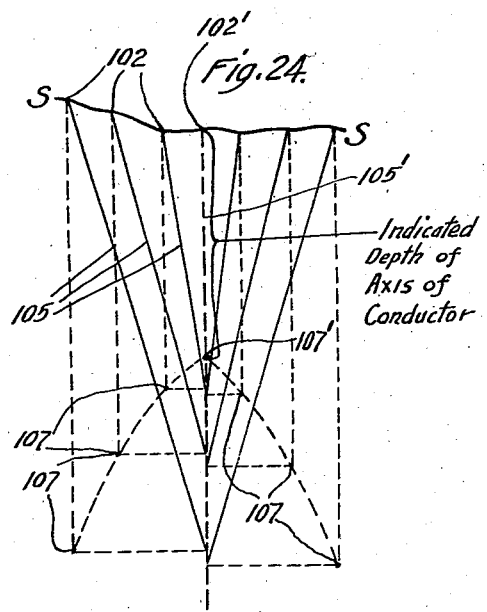
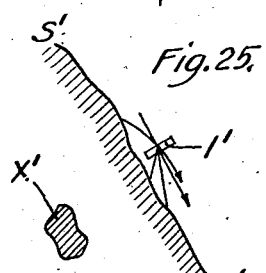
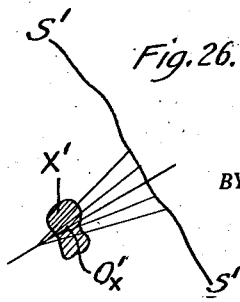
INVENTOR.
Edward H. Guilford
BY
ATTORNEY.

Patented June 24, 1930

1,766,378

UNITED STATES PATENT OFFICE

EDWARD H. GUILFORD, OF GLENDALE, CALIFORNIA, ASSIGNOR TO THE RADIORE COMPANY, OF LOS ANGELES, CALIFORNIA, A CORPORATION OF CALIFORNIA

METHOD OF LOCATING UNKNOWN CONDUCTIVE BODIES

Application filed April 11, 1927. Serial No. 182,628.

This invention relates to the location of unknown conductive bodies, for example ore bodies, pipe lines and the like, within the earth's crust or within any mass of less conductive material, and particularly to methods for this purpose in which a high frequency electromagnetic field (called the primary field) is established in the region in which such a conductive body is to be searched for, which results in setting up an alternating electric current in any such conductive body within such region, said alternating current being of a frequency equal to that of the primary field, and said alternating current causing a secondary electro-magnetic field of the same frequency to be set up, the axis of said secondary field being the axis of conductivity of the unknown conductive body, and in which the resultant effects of the lines of force of the primary and secondary electromagnetic fields throughout such region are determined by means of a direction finding coil receiver, and the position of the unknown conductive body is calculated or plotted from the indications thus obtained.

The chief object of the invention is to afford greater accuracy of indications as to the location of the unknown conductive body. A further object of the invention is to provide such a relation between the primary and secondary fields that the strongest possible relative effect of the direction of the secondary field, as compared to that of the primary field, is obtained at the points of measurement.

A further object of the invention is to minimize or entirely eliminate the secondary fields about all conductive bodies in the region being explored, with the exception of one particular conductor, and hence obtain the most accurate indications as to the position of that one conductive body.

Further objects of the invention are to determine accurately the plan view location, the length, and the depth of conductive bodies and particularly of ore bodies. A particularly important object of the invention is to determine more accurately than has heretofore been possible the exact depth of an unknown conductor.

An essential feature of my invention, by which the above objects are accomplished, consists in the use of a loop transmitter, as distinguished from an antenna transmitter, for setting up the primary field, with the result, that, once the approximate location of an unknown conductive body has been determined the plane of the loop transmitter may be directed toward the indicated position of the axis of such body, so as to cause the maximum current induction therein with a consequent maximum intensity of secondary electromagnetic field surrounding the same. By this means the relative intensity of the secondary field as compared with the intensity of the primary field at the points at which measurements are to be made may be caused to be relatively great.

As hereinafter explained, under the conditions existing in any method of the general type above referred to for locating conductive bodies, there are two electromagnetic fields to be considered, the primary field and the secondary field, and these two fields in general differ from one another at any particular point not only in regard to direction of motion of the field, but also in regard to the direction of the electromagnetic lines of force, so that the determination of the direction of the secondary field is not such a simple problem as might at first appear. The effect of each of these fields upon a direction finding coil, such as is usually employed in these methods, is in general proportional to the strength of such field at the position of the coil (subject to certain qualifying conditions hereinafter discussed) and it is therefore evident that it will in general be advantageous, in order to obtain the most positive and accurate indications as to the location of the unknown conductor, to provide a secondary field whose relative strength, as compared to the primary field, is a maximum. It is principally in order to obtain this maximum relation of secondary field strength to primary field strength that I prefer to use a loop transmitter for creating the primary field.

It has heretofore been customary, in the location of unknown conductive bodies by the general methods above outlined, to employ an antenna transmitter for establishing the primary electromagnetic field. The field created about such a transmitter is in general substantially vertically polarized and its direction can not be altered in such manner as to accommodate the same to the position of the unknown conductive body whose location is to be determined. The loop on the other hand is essentially directional, both as regards transmission and reception thereby, and furthermore the plane of the loop may be varied as desired, and it is therefore possible, as is well-known, to increase to a maximum the transmission from a loop to a conductor, by providing the proper relation between the direction of the plane of the loop and the location of the axis of the conductor, as well as to increase the reception in a direction-finding coil by so placing the coil that its plane passes through the source of the electromagnetic field from which such current is to be derived. The use of a transmitting loop therefore enables the operator not only to provide maximum current induction in the underground conductor and hence maximum strength of secondary field, but also permits this to be accomplished with a minimum current induction in other nearby conductors and hence a minimum disturbing effect.

A further advantage of the use of a loop as the transmitting means is that it may readily be transported to a location adjacent the region to be explored and may be quickly set up or dismantled so that a primary field of less strength than has heretofore been necessary may be satisfactorily employed due to the proximity of the transmitting loop to the supposed location of the conductive body. Furthermore after the position of the conductive body has been roughly determined as hereinafter described the transmitting loop may be set up at a point close to such body, while the receiving coil which is utilized as hereinafter described for determining the resultant effects of the two fields may be set up at points at a sufficient distance from the transmitting loop, so that at the position of such receiving coil the secondary field about the conductive body is relatively strong as compared to the primary field.

It is of course evident that the desired direction of the plane of the transmitting loop for obtaining maximum accuracy of results can not be properly determined until the approximate location of the axis of the unknown conductive body is determined and it might therefore be supposed that this method would be inoperative, since it depends for its use in accurate locations of conductive bodies upon knowledge of the approximate location thereof, and since there is no way of telling at first in what position the transmitting loop should be placed in order to secure the strongest current induction in the conductive body. I have found, however, that a secondary field of sufficient strength for obtaining indications with a receiving coil may be established about the conductive body by means of current induced therein by the transmitting loop, even though the direction of the plane of such loop is not exactly toward the conductive body, and that by setting up the transmitting loop in a relatively small number of positions and exploring with a receiving or direction-finding coil in a certain neighboring region for each position of the transmitting loop, preliminary indications may be readily obtained as to the approximate location of any conductive bodies within such region, and after such approximate location has been determined the loop may be directed toward such location so as to enable more definite and accurate indications to be obtained. My invention therefore includes the application of a loop transmitter in connection with a coil receiver, both for determining the approximate location of conductive bodies and for subsequently determining the more exact locations thereof by utilization of the obtained information regarding the approximate locations.

The occurrence of a secondary high frequency alternating electromagnetic field about a conductor which is located within a primary high frequency alternating electromagnetic field is commonly known as re-radiation, and methods of the general type above described for locating unknown conductive bodies may therefore be called, in general, "re-radiation methods". These high frequency electromagnetic fields comprise both radiation and induction fields, either one of which may represent the greater part of the total field at any particular point, depending upon the relation between the frequency of the field and the distance of such point from the source of the field. The expression "electromagnetic field" will therefore be used herein as including both the radiation and induction field, and the term "re-radiation" should therefore be understood as including the production of a total secondary electromagnetic field, of which either the "radiation" component or the "induction" component may predominate at the point or points at which measurements are made in the secondary field. Furthermore the electromagnetic lines of force of any high frequency field may, for the sake of clarity, be spoken of hereinafter as "magnetic" lines of force, and the electrostatic lines of force may be spoken of as "electric" lines of force. The directions of the magnetic and electric lines of force are substantially perpendicular to one another at any point in the field. For a verification of the above definitions and relationships, reference may be had to Bureau of Standard Scientific Paper No. 354, Part III, pages 452 to 456, by Dr. J. H. Dellinger, and to "Principles of Radio Communication" pages 181 to 183, and 694 to 705, by J. H. Morecroft, published 1921, by John Wiley and Sons.

The accompanying drawings illustrate my invention and referring thereto.

Fig. 1 shows a characteristic curve of current induced in a receiving coil by an electromagnetic field.

Fig. 2 is a curve representing the resultant current induced in a receiving coil by two component fields.

Fig. 3 is a diagrammatic vertical section showing the directional properties of a transmitting loop.

Fig. 4 is a diagrammatic vertical section illustrating the general relation of the transmitting loop and the receiving coil to the axis of the underground conductor, in the practice of my invention.

Fig. 5 shows the resultant current curve obtained by a receiving coil acted upon by two electromagnetic fields, when said fields are in phase with one another and when they are 180° out of phase.

Fig. 6 shows a similar curve when the two component currents are 90° out of phase.

Fig. 7 is a side elevation of a form of transmitting loop which may be used in carrying out the method of my invention.

Fig. 8 is a partial vertical section thereof on line 8—8 in Fig. 7.

Fig. 9 is a diagrammatic representation of one form of electric circuit for use in connection with the transmitting loop.

Fig. 10 is a side elevation of a receiving coil which may be used in carrying out my invention.

Fig. 11 is a plan view thereof.

Fig. 12 is a diagrammatic representation of said receiving coil and of a form of detecting circuit for use in connection therewith.

Fig. 13 is a diagrammatic plan view illustrating the method of obtaining indications as to the presence of unknown conductors by rotation of the receiving coil about a vertical axis.

Fig. 14 is a diagrammatic vertical section illustrating the method of obtaining such indications by rotation of the receiving coil about a horizontal axis.

Fig. 15 is a diagrammatic plan view illustrating the method of conducting a preliminary survey according to my invention.

Fig. 16 is a diagrammatic vertical section representing a set of "dip" readings obtained when the primary and secondary currents are substantially in phase.

Figs. 17 and 18 are similar views representing out of phase conditions.

Fig. 19 is a diagrammatic plan view illustrating the method of making an intermediate survey for determining the frequency of primary field at which an in phase condition is obtained.

Fig. 20 is a diagrammatic vertical section illustrating different types of "dip" readings obtained in such an intermediate survey.

Fig. 21 is a diagrammatic plan view illustrating the method of conducting the final survey.

Figs. 22 and 23 are diagrammatic views illustrating the effect of difference in elevation of transmitting loop and receiving coil.

Fig. 24 is a diagrammatic vertical section showing a set of "dip" readings obtained in the final survey.

Figs. 25 and 26 are views similar to Figs. 3 and 16 respectively, but illustrating a possible modification of the invention for locating a conductor within a steepsided hill.

For the purpose of clearly outlining the laws governing the action of a coil used for direction finding purposes, reference is first made to Fig. 1 which shows the characteristic curve of the intensity of current induced in a coil 2 by a single electromagnetic field, as the coil is rotated through 360° about an axis $O_1$ perpendicular to a plane embracing the source of the field and the direction of the magnetic lines of force at the position of the coil. The direction of the magnetic lines of force is indicated by the curved arrows. It is well known to those versed in the art that for the condition of maximum current induction, and hence of maximum signal intensity, the plane of the coil extends in the position shown, namely, in a direction toward the source of the electromagnetic field, while for any other position of the coil the current induction follows the figure-of-eight curve shown. This is due of course to a variation in the total flux through the coil, the position of maximum signal intensity being that at which such flux is a maximum. If, on the other hand, the coil be turned to the position shown and then rotated about an axis $O_2$ perpendicular to the axis $O_1$ and extending toward the source of the field, it will be found that as the position of the coil deviates from the position perpendicular to the magnetic lines of force of the field, the current intensity also decreases and follows a similar figure-of-eight. The coil therefore, when rotated about an axis pointed toward the source of the field indicates by its position at the time of maximum signal intensity the direction of the magnetic lines of force of the field, at the coil. If, for example, the field is vertically polarized, or if the lines of magnetic force are horizontal or tangent to the horizontal at the position of the coil, Fig. 1 may be considered as a plan view, and the coil indicates by its position at the time of maximum signal intensity not only such direction of polarization or the direction of the lines of magnetic force, but also the direction toward the source of the field. If the lines of magnetic force were not tangent to the horizontal at the position of the coil, indicating an apparent non-vertical polarization of the field, then rotation of the coil about a horizontal axis pointing toward the source of the field would give a maximum current induction when the plane of the coil extended in a direction perpendicular to the magnetic lines of force and would thus indicate the direction of such lines of force at the coil. It will be seen therefore that a coil receiver may be used to indicate both the direction from the coil toward the source of the field and also the direction of the lines of force of the field at the coil.

It may be noted here that, in actual practice, it is customary, instead of directly determining the position of the coil for maximum current induction, to note the direction indicated by the two positions of minimum current induction (minimum signal intensity), and then take as a direction of maximum a direction half-way between the two minimums. This is for the reason that the minimums are generally much sharper than the maximums, and more accurate results are thus obtained. Without the presence of the so-called "antenna effect" the minimums will occur 180° apart and hence the indicated direction toward the axis of the field will be 90° to either minimum. The antenna effect, however, often tends to make the minimums broad instead of sharp and also tends to cause the minimums to occur other than 180° apart (less than 180° in one direction and greater in the other). In determining the direction of electromagnetic fields for the purpose of this invention, it is highly essential that such "antenna effect" be recognized and compensated for, or eliminated or reduced as far as possible, and for this purpose care must be exercised in the design of the coil and its auxiliary apparatus. This antenna effect together with its influence in broadening or displacing the minimum readings obtained by a coil, and methods of eliminating it, are outlined in Bureau of Standards Scientific Paper No. 428, pages 541 to 544. While that paper deals particularly with the antenna effect when a single field is imposed upon the coil, it has been found that the methods of elimination of antenna effect therein outlined also give satisfactory results when two or more fields are imposed on the coil, as by the method of the present invention and these or other methods of prevention should therefore be followed in all cases in order to secure the most accurate results.

In Fig. 2 is represented the curve of resultant current induced in a coil by two electromagnetic fields A and B, which are in phase with one another and are identically polarized or whose magnetic lines of force either lie in or are tangent to the same plane either lie in or are tangent to the same plane but whose sources are at different directions from the coil. In this figure, $I_a$ represents the current curve which would be produced by the field A, and $I_b$ that which would be produced by the field B. The resultant current curve, for a condition when the fields are of identical frequency and when the currents induced thereby in the coil are in phase, is shown in dotted lines at I, and indicates as shown, the direction toward the apparent source of an imaginary field which would produce the same effect upon the coil. The angles of apparent distortion in the direction of the respective fields due to the effect of the other field, are indicated at $\triangle a$ and $\triangle b$. A difference in direction of lines of force of the two fields at the position of the coil would have a similar effect upon the current curve obtained upon rotation of the coil about an appropriate axis. It may therefore be seen that if a plurality of readings be taken with a coil in a region in which such coil is subject to the action of two electromagnetic fields whose sources lie at different directions from the coil and whose magnetic lines of force extend in different directions, then if the direction toward the course of one of the fields and the direction of its magnetic lines of force are known, the location of the axis of the other field may be calculated. It will be understood that in the actual cases usually encountered in the location of underground conductive bodies the direction of the lines of force of the primary field and of the secondary field at the point of measurement are not generally such as to correspond to fields of identical polarization so that the problem is somewhat more involved than the simple case above outlined, but nevertheless such a problem may be readily solved by the procedure hereinafter outlined It is also evident from Fig. 2 that the apparent direction indicated by the resultant current curve obtained with a coil is dependent not only upon the directions of the two fields, but also upon the relative intensities thereof at the position of the coil. In said figure, for example, such apparent direction is nearer to that of the larger field A whose current curve is shown at $I_a$, than to that of the smaller field B. In other words the apparent distortion in direction $\triangle a$ of the larger field is less than the apparent distortion in direction $\triangle b$ of the smaller field. In order, therefore, to obtain the most accurate indications of the direction of the secondary field surrounding an unknown conductor, it is necessary that the strength of such secondary field at the point of observation be as great as possible as compared with the primary field used to induce the flow of current in such conductor. This result is obtained according to my invention by employing a loop transmitter for creating the primary field as hereinafter outlined, in such manner that a maximum current induction in the unknown conductor is obtained, accompanied by a maximum relative strength of secondary field surrounding the same.

In Fig. 3 the directional property of a loop transmitter is illustrated. The line S—S represents the earth's surface and X a vertical section of an underground conductor, such as an ore body, whose electrical axis is located at $O_x$. If a loop transmitter 1 be operated at the point C vertically above $O_x$, then the full line curve about point C represents the relative strength of the electromagnetic field produced thereby in all directions. The relative strength of such field in the direction of the body X is therefore represented by the distance CD, which induces a certain current flow in such body, resulting in the creation of a secondary field surrounding the same, whose relative strength may be indicated by the full circle about axis $O_x$. If, on the other hand, the loop be turned to some other position, as indicated in dotted lines, then the dotted curve will represent the relative primary field strength. The relative strength of the primary field in the direction of the body X will then be CE, or somewhat less than before, resulting in a smaller current induction in such body and a secondary field of less intensity, as indicated for example by the dotted circle about $O_x$.

It will be evident from the above that if a coil receiver be placed in the vicinity of the transmitting loop and of the underground conductor, such coil will be influenced both by the primary field from the loop and by the secondary field about the underground conductor. Such a set of conditions is illustrated in Fig. 4 and it may be seen that, if the distance FG from the transmitter 1 to the receiver 2 is fairly comparable with or greater than the distances FH and JG, the effect of the secondary field may be comparable with, or greater than, that of the primary field. This may be explained by the fact that the high frequency current induced by the primary field in the conductive body whose axis is indicated at $O_x$ is readily conducted throughout the length of such body and creates a secondary field whose axis extends substantially throughout the length of the body. So far as the secondary field is concerned, therefore, the receiving coil is affected to substantially the same extent as though it were above the same portion of the conducting body as is the transmitting loop, but it is much less affected by the primary field, due to the distance FG through which such primary field travels before reaching the receiving coil. As is well known, the strength of the induction component of an electromagnetic field varies inversely as the square of the distance from the source, while the radiation component varies inversely as the distance. Since at the short distances ordinarily involved in the practice of this method, the induction component constitutes the major portion of the total field, it will be seen that the effect of distance upon intensity of the field is quite important.

The effect of phase relationship of the component currents upon the resultant current curve obtained with a receiving coil is illustrated in Figs. 5 and 6, in which $I_1$ and $I_2$ represent the current curves for the primary and secondary fields respectively. In Fig. 5, $I_0$ is the resultant current curve when the currents produced by the two fields are in phase at the position of the coil, that is with 0° phase difference, while $I_{180}$ is the corresponding curve when the two currents are 180° out of phase. The directions of the plane of the coil for minimum signal strength in the two cases are indicated by the two lines M—M', one for 0° phase difference and one for 180° phase difference, while $\triangle_0$ and $\triangle_{180}$ represent the apparent distortion in direction of the primary field for the two cases. It will be seen that the distortion produced in the out-of-phase condition is opposite in direction and greater than that produced in the in phase condition, and also that the resultant current is much greater when the two currents are in phase than when they are 180° out of phase.

In Fig. 6 the curve $I_{90}$ represents the resultant current when the currents induced by the primary and secondary fields are 90° out of phase. It will be seen that under these conditions the resultant current is but little greater than the larger of the component currents and that but little apparent distortion of the stronger field is indicated. The most characteristic feature of the curve $I_{90}$, however, is that the minimum points are decidedly rounded instead of sharp, and that the resultant current does not become zero for any direction of the coil. These rounded minimums are of course objectionable in practice as they absolutely prevent the accurate determination of directions by the coil. They are always obtained when the two components are out of phase by any amount between 0° and 180°, and such an out-of-phase condition should therefore be avoided in practice.

Any departure from an in phase relationship therefore decreases the strength of the resultant current and gives weaker signals. It also decreases the sharpness of the minimum points (except for 180° out of phase) and hence makes the readings less accurate. It is therefore extremely desirable to maintain a substantially in phase relationship between the primary and secondary fields, which can be detected by the sharpest indications of minimum signal strength, and by maximum signal intensity, or by other methods as hereinafter described. The occurrence of an in phase condition in methods of this type for the location of underground conductors, depends upon the relationship between the distances of the sources of the two fields from one another and from the detecting or direction-finding apparatus, and upon the frequency of the field. The term "in phase" or "0° phase" means that corresponding values of the two fields reach the receiving coil at exactly the same instant.

Having briefly described certain of the fundamental principles and phenomena upon which my invention is based, I will now proceed to describe certain apparatus which may be used therein, and to outline the methods which I use and show how the principles and phenomena above referred to are made use of in such methods.

As shown in Fig. 7, the transmitting loop 1 may be wound upon the outer end portions of four arms 25 mounted upon and extending outwardly from a central supporting block 26. Said loop may consist of any suitable number of turns of copper wire for giving the desired values of inductance. The central supporting block 26 may be detachably secured as by means of screw 27 to supporting member 28 which is pivotally mounted at 29 on supporting base 30 so as to hold the loop in a substantially vertical plane and permit the same to be rotated about a horizontal axis, such rotation being effected for example by means of adjusting screw 31. The base 30 may in turn be rotatably mounted upon a sub-base 32 so as to permit rotation of the loop about a vertical axis by operation of adjusting screw 33. Said sub-base 32 may be mounted upon a suitable supporting tripod 34 such as is commonly used in surveyor's transits and the like, and because of the distance of the sides of the loop from the center thereof I find it advantageous to mount the same so that the lower side extends between the legs of the tripod, as shown in Fig. 7.

Any suitable form of energizing circuit may be used for producing the high frequency current oscillations in the loop. One form of such circuit is shown diagrammatically in Fig. 9. Such circuit comprises a dynamotor 36 whose input terminals are connected by wires 37 to a suitable source of direct current power supply, and whose output terminals are connected by wires 38 to the primary winding of transformer 39 so as to deliver thereto alternating current of any suitable relatively low frequency. The center of the secondary winding of said transformer is connected through choke coil 40 to the filaments 41 of thermionic tubes 42, each of which comprises in addition to said filaments, the usual plate 43 and grid 44 of the ordinary three electrode thermionic tube. The secondary winding of transformer 39 is preferably provided with a plurality of taps as shown and means are provided whereby connection may be made from any desired taps through choke coils 46 to the plates 43 of the respective thermionic tubes. The filaments 41 may be connected through adjustable resistance means 47 and reversing switch 48 to the same source of direct current power supply as is used for dynamotor 36. The plates 43 may be connected through plate stopping condensers 49 to one of the end connections 50 of the loop 1, while the grids 44 may be connected to the other end connection 51 of said loop. A connection is also provided from filaments 41 through grid condenser 53 and grid bias battery 54 to the intermediate connection 55 of the loop. Means are preferably provided whereby the connections 50, 51 and 55 may be adjusted on the loop so as to include any desired number of turns of wire between these respective connections. Tuning of the loop circuit to give the desired frequency of oscillation may thus be accomplished partly by varying the inductance of the loop and partly by means of loading condenser 57 and variable tuning condenser 58 which are connected as shown between the end connections of the loop.

The parts of the above described circuit and particularly the tubes, transformer, choke coils, condensers, and all parts requiring adjustment during operation may advantageously be mounted within a cabinet or casing 60 which may be supported on one of the legs of tripod 34 as shown in Fig. 7.

While I have described one particular type of circuit for producing high frequency current in the transmitting loop it will be understood that any other suitable means may be employed for this purpose.

For the purpose of determining the presence and the direction of any secondary electromagnetic fields in the area being explored and hence determining the location of underground conductors beneath such area, I prefer to employ a receiving apparatus comprising a direction-finding coil or loop antenna mounted upon a tripod having means for levelling and orienting the same, and said coil being so mounted as to permit rotation thereof about a horizontal axis and a vertical axis so that the coil may be brought into any desired plane. Means are also provided for indicating both the horizontal and vertical angles of the plane of the coil at any time. Such apparatus may comprise as shown in Figs. 10, 11 and 12, a wire coil 2 of sufficient turns and dimensions to efficiently intercept, in combination with the variable condenser 65 for the purpose of tuning or bringing to resonance, a sufficient amount of energy from the electromagnetic field produced by the transmitting loop or by the unknown conductor or from both such fields for detection purposes. The coil is mounted upon a horizontal axis 66 which is in turn mounted upon a suitable supporting device such as a semi-circular bracket 67 mounted to turn about a vertical axis 68 on a supporting tripod 69. Suitable scale means 70 and 71 may be provided for indicating the rotation of the coil about the horizontal axis 66 and the vertical axis 68. Suitable level devices 72 may be provided so that the axis 68 may be brought accurately to a vertical position and the axis 66 to a horizontal position, and a telescope 73 may be provided for orienting the device with respect to some known point or direction, such as North. As shown in Figs. 10 and 11, said telescope may serve as the horizontal axis of the coil.

The two terminals 74 and 75 of coil 1 are connected respectively to the grid 76 and plate 77 of a thermionic tube detecting device 79 which is also provided with the usual filament 78. The connection between terminal 74 and grid 76 includes grid condenser and grid-leak 80 while the connection between the terminal 75 and plate 77 includes plate condenser 81. The terminal 82 which is located at approximately the middle of the winding of coil 2 is connected to one terminal of filament 78. Suitable means such as battery 83 may be provided for supplying electric current for heating the filament 78 and a reostat 84 may be provided for regulating such current supply. A suitable source of direct current supply such as battery 85 may be connected to the plate circuit of tube 79, said battery being adapted to deliver current at a voltage corresponding to the characteristics of said tube. A suitable electric current indicating device such as a pair of telephone receivers indicated at 86 is also connected in series with battery 85. The circuit just described constitutes a so-called oscillating detector circuit well-known in the art of radio communication and it will be understood that any suitable detecting and amplifying circuit or means may be employed for detecting and amplifying and measuring the current received by coil 2, in the place of that shown and described. The various parts of the circuit shown in Fig. 12 may conveniently be mounted in a suitable casing 87 which may be suspended on the tripod 69 as shown in Fig. 10.

When the coil 2 is placed in the region of an electromagnetic field in such manner that the magnetic lines of force of such field cut said coil, a small electromotive force is induced therein, with a resultant current flow in the circuit composed of said coil and variable condenser 65 provided said condenser has been so adjusted that said circuit is in resonance with the said magnetic field. If now the oscillating circuit be adjusted by means of condenser 65 so as to be slightly out of resonance with the electromagnetic field then a sound will be heard in the telephone receivers 86, the pitch of which will depend upon the difference in frequency between the electric current induced in the oscillatory circuit by the electromagnetic field and the electric current set up therein between the thermionic tube oscillating and detecting elements. The intensity of the sound thus produced in the telephone receivers will vary as the coil is rotated about its axis, and the position of the coil in which the intensity of such sound is at a maximum will be that in which the electromagnetic force therethrough is at a maximum. It is well-known that this position is such that the plane of the coil is perpendicular to the direction of the lines of magnetic force of the field in which the coil is placed or if two such fields exist together, then the plane of the coil for maximum intensity of signal reception depends upon the principles above described, as illustrated for example in Figs. 5 and 6. A position of minimum signal intensity may also be found, which will be perpendicular to the direction of maximum intensity provided proper precautions have been taken to overcome the "antenna effect" above referred to, and for the reasons heretofore stated, it is this position of minimum signal strength which is determined in practice.

In practicing my invention I proceed in general to set up a primary electromagnetic field within the earth's crust or in any mass of relatively less conductive material within which it is desired to determine the location of conductive bodies, by means of a transmitting loop 1 whose circuit, as above described, is entirely independent of said mass of less conductive material and which is mounted in a vertical plane, as shown in Fig. 13, so that the direction of the lines of force of such primary field is known, and to then determine the direction of minimum (or maximum) resultant current induction obtained with the direction-finding coil at different points in a certain region adjacent the loop, by rotating the coil first about a vertical axis and then about a horizontal axis. At each set-up of the receiving coil, the loop is preferably turned so that its plane passes through the position of the coil. The term "loop" will be used throughout this description to designate the transmitting loop and the term "coil" to designate the direction-finding coil.

If the coil is rotated about a vertical axis, at some position such that it is acted upon only by the primary field, as at 2a, the plane of the coil at the time of maximum signal reception will indicate the direction toward the loop as shown for example at a in Fig. 13. In case any underground conductor such as an ore body is present in the region, however, a secondary electromagnetic field will be created about the axis of such conductor and when the coil is brought within the effective region of such secondary field it will be acted upon by both the primary and secondary fields and its direction at the time of maximum signal strength will apparently be distorted.

For example, in Fig. 13 the axis of an underground conductor is indicated at $O_x$, and if it be assumed that such axis lies in a horizontal plane, then the electromagnetic lines of force of the secondary field at any point intermediate the ends of the conductor will extend around the axis thereof and substantially in a vertical plane perpendicular to the axis of the conductor, as indicated, for example, by the straight arrow at 4 in Fig. 13. Therefore, if the receiving coil is placed in the position 2b in this figure, it will be acted upon by this secondary field as well as by the primary field whose magnetic lines of force extend in the direction indicated by the curved arrow 5, and if the coil is then rotated about a vertical axis the plane of the coil at the time of maximum signal strength will not indicate the direction toward the loop but will indicate some other direction for example as shown at b, and in general, if the primary and secondary fields are in phase with one another or substantially so, the direction indicated will lie somewhere between the direction which would be indicated if the primary field alone were present and that which would be obtained if the secondary field alone were present.

It may be well to point out here that the distortion in the "maximum" position of the coil from that which would result from the primary field alone, when such coil is rotated about a vertical axis, is not due to a difference in direction to the source of the secondary field, but to a difference in polarization or to a difference in the direction of the lines of magnetic force thereof, and in general it is true in methods of this type that the resultant direction of the coil when rotated about a vertical axis is determined by the direction toward the source of the primary field and the direction of polarization or direction of the magnetic lines of force of the secondary field, and that, as will be shown later, the resultant direction of the plane of the coil when rotated about a horizontal axis is determined by the direction of polarization or the direction of the magnetic lines of force of the primary field and the direction toward the source of the secondary field.

In practice the term "strike" has been used to designate the horizontal angle between the plane of the coil at the time of maximum signal reception when rotated about a vertical axis and a certain known direction, such as north, and this term will be employed throughout this description to designate this angle. The "strike" readings obtained as above described furnish important indications as to the location, and particularly as to the plan view location, of the axis of an underground conductor. As long as the "strike" readings indicate a direction approximately toward the loop as at a, there is no indication of the existence of an underground conductor, but any marked deviation of the "strikes" from this direction, as indicated at b in Fig. 13, indicates in general the presence of such a conductor. The particular means which I employ for interpreting the indications obtained by the "strike" readings will be described in greater detail hereinafter.

In Fig. 14 I have illustrated the indications obtained by rotating the coil about a horizontal axis while in the region of a secondary field about an underground conductor. As in Fig. 13, at the position 2a the coil is outside the region in which it is noticeably effected by the secondary field, and in this position the coil at the time of maximum signal strength lies in a vertical plane. In some other position such as 2, however, in which the coil is more nearly above the axis $O_x$ of an underground conductor, the coil will be influenced by the secondary field as well as by the primary field and its plane at the time of maximum signal strength will be distorted from the vertical and in general, if the primary and secondary fields are substantially in phase with one another, the direction of the plane of the loop at such time will lie somewhere between the vertical and the direction toward the axis $O_x$ as indicated, for example, at 7. In practice the angle of inclination of the coil (with respect to the vertical) at the time of maximum signal reception, that is the angle 8 in Fig. 14, is termed the "dip" angle, and this term will be used to designate this vertical angle throughout this description. The variations in "dip" readings provide important indications as to both the plan view location and the depth of the axis of an underground conductor, as will be hereinafter explained.

I will now describe in somewhat greater detail the methods which I prefer to use for first detecting the presence of an underground conductor and then determining as accurately as possible the plan view location and the depth of such conductor. These methods include in general three successive surveys over the region of the conductor, as follows:

1. Preliminary survey.
2. Intermediate survey.
3. Final survey.

In making a preliminary survey, for example in a region such as indicated in plan view in Fig. 15, the loop 1 is set up at some convenient point within or at one end of such region as shown, with the plane of the loop vertical and extended in a direction toward the region to be explored and preferably toward the position of the coil for each observation. The preliminary survey may advantageously be conducted within the area bounded by the dotted line 11, said area extending from a suitable distance V from the loop to whatever distance the primary field is of sufficient strength to permit, and also extending to a certain distance either side of a line 12 extending through the loop and through the center of said area. The distance V may, for example, be from 100 to 200 feet and should in general be greater than the distance from the line 12 to the edges of the region to be explored. While the loop is in this position a number of rough traverses 13 are then run perpendicular to the line 12 and at suitable distances apart, say from 50 to 250 feet depending upon the average length of ore bodies found in the district under investigation. The direction-finding coil is then set up at a plurality of points 14 on each of these traverses, the distance between set ups being, for example, from 25 to 75 feet. At each set up of the coil the "strike" reading is determined as above described, and then the "dip" reading with the horizontal axis of the coil in the direction of the "strike" reading. As stated above the plane of the transmitting loop is maintained vertical and its horizontal axis is preferably pointed toward each set up of the receiving coil. For example, when the coil is operated at the point 14′, the plane of the loop is set in the direction toward such point, as indicated in dotted lines.

A set of "strike" indications which may be obtained in this manner are illustrated in Fig. 15. It will be seen that when the coil is affected only by the primary field transmitted by loop 1 the "strike" readings indicate directions toward said loop as at 15. The axis of an underground conductor is indicated at $O_x$ and it will be seen that as the coil approaches a point above this conductor the "strikes" are distorted and may indicate a direction somewhat toward the direction of the axis of the conductor as shown at 16, provided that the primary and secondary fields are not too far out of phase with one another. It will also be apparent that in general the greatest distortion from the direction toward the loop will occur most nearly above the axis $O_x$ and an approximate idea as to the plan view location of the conductor may thus be obtained.

A more important and positive indication, however, is furnished by the "dip" readings taken as above described. A set of such "dip" readings taken on one of the traverses 13 is illustrated in Fig. 16. "Dips" of this character are obtained only when the two fields are approximately in phase with one another. It will be seen that directly above the axis of the conductor the coil indicates a vertical "dip" as at 17, while at either side of this position the "dips" such as 18 and 19 converge below the surface due to the apparent distortion in the primary field caused by the presence of the secondary field. In general, downwardly converging "dips" about a point of vertical "dip" indicate the presence of an underground conductor below the point of vertical "dip". It has also been found that when the two fields are approximately in phase with one another, the "dips" converge below the conductor and the intersections approach more closely the position of the axis of the conductor as the coil approaches a position vertically above the same. Thus the "dips" 18 intersect closer to the axis of the conductor than the "dips" 19. It may be seen that if the coil is moved still further away from the point of vertical "dip" 17, vertical "dips" may again be obtained as indicated at 20, but as such "dips" continue to remain vertical as the coil is moved outwardly they indicate the presence of the primary field alone in this area. In practice the vertical "dip" 17 between the downwardly converging "dips" is called a "true vertical", while the dips such as 20 are called "neutral verticals".

If the current induced in the receiving coil by the primary field about the loop and that induced by the secondary field about the underground conductor are materially out of phase with one another, then the "dips" will not converge in the manner above described, but will behave somewhat differently. For example, if the two currents are approximately 180° out of phase, and the ratio of currents induced in the coil by the secondary and primary fields, expressed arbitrarily as $\frac{I''}{I'}$, is less than unity, the "dips" at either side of a true vertical will intersect or converge above the surface of the earth S—S as shown in Fig. 17. If, on the other hand, with the same phase relationship, the ratio $\frac{I''}{I'}$ is greater than unity, the "dips" will converge beneath the surface of the earth S—S but above the conductor, as shown in Fig. 18. Either one of these conditions, however, will serve to indicate the approximate location of the axis of a conductor, as it will be seen that in any of the cases above mentioned a vertical "dip" is obtained above such axis and that the "dips" taken at either side of this position converge toward one another, either above or below the surface of the earth. Generally speaking, any of these conditions will therefore afford a sufficiently accurate indication for the purposes of the preliminary survey, although an in phase condition is to be preferred, as it leads to stronger coil currents and consequently to more positive indications.

If the phase relationship of the currents induced in the coil by the two fields departs very greatly from 0° or 180°, for example if the 90° out of phase condition shown in Fig. 6 prevails, the "dips" will also in general be distorted from the vertical and will converge more or less definitely above or below the surface of the earth and in a vertical plane through the axis of the conductor. The minimums obtained under these conditions, however, will not be sharp, and for this reason it is best, even in the preliminary survey, to avoid this condition by using a primary field of such frequency as to produce reasonably sharp minimum readings in every case.

In case the preliminary survey conducted with the loop in the position shown in Fig. 15 gives no indication of the presence of an underground conductor, that is to say that if the "strike" readings obtained with the coil are always substantially toward the position of the loop and the "dip" readings are always substantially vertical, then the loop may be moved to a position such that when turned toward the same region as before the general direction of its plane will be substantially perpendicular to its former general direction and a second preliminary survey made. Generally speaking if there are any unknown conductors in the region thus surveyed and within a suitable depth below the surface of the ground, there will be sufficient current induced therein by the loop in one or the other of these two positions to create a secondary field having a noticeable effect on the coil, so that if no indications are obtained in either of these preliminary surveys, it may be considered as fairly certain that there are no underground conductors of any considerable proportion within the area explored, and within a depth at which the method is operable. These preliminary surveys may be repeated for every section of the area to be explored so as to locate all underground conductors in such area.

It will be seen that the preliminary survey not only serves to detect the presence of any underground conductors, but also, where such conductors are found, it establishes a point on each traverse which is substantially above the axis of the conductor and the series of points so determined indicate the approximate plan view location and the general direction or "strike" of the axis of the conductor.

The next step in the process, which may be termed the intermediate survey, is for the purpose of determining the frequency of primary field which will cause the primary and secondary fields to be substantially in phase with one another at the position of the receiving coil for each conductor located in the preliminary survey, so as to obtain the sharpest possible minimum coil currents and consequently the most accurate indications, and hence obtain an indicated resultant direction of electromagnetic field which is as near as possible to the true direction of the secondary field.

The reason for variation in phase relationship of the two component currents may be understood by referring again to Fig. 4. While the primary field travels directly from F to G, the path travelled by the energy reaching G in the form of the secondary field is more involved, and includes passage of the primary field from F to H, conversion into electric current in the conductor $O_x$, re-conversion into a secondary electromagnetic field about such conductor, and the passage of this secondary field from J to G. It is evident, therefore, that in order to have corresponding values of the two fields reach the coil at the same instant, certain definite frequencies or wave lengths must be employed, and that if any other frequency is employed the two fields will be out of phase with one another by amounts varying between 0° and 180°.

In making the intermediate survey the loop 1 is set up, as shown in Fig. 19, in some position directly above the indicated plan view position of the conductor as determined in the preliminary survey above described, with its plane vertical and preferably toward the position of the coil. The receiving coil 2 is then set up, as also shown in Fig. 19, at a position sufficiently removed from the loop, along the direction of the axis of the conductor, so that the primary field will not predominate too strongly over the secondary field, and at a suitable distance, say 10 to 25 feet, at either side of the horizontal profile $O_x''$ of the axis. The horizontal axis of the coil is maintained parallel to the general direction or "strike"

of the axis of the conductor, as determined in the preliminary survey, and the coil is then rotated about this axis, and the "dip" readings noted, for different frequencies of primary field.

A set of "dip" readings such as may be obtained in this manner are shown in Fig. 20. Some frequency will be found at which a maximum "dip" such as CK will be obtained, while if the frequency is either increased or decreased in suitable steps from this value, the "dips" will decrease as at CL, CM, and CN. If the frequency is varied still further "dips" such as CQ and CR may be obtained and upon still further variation the "dips" will again return from CR through CQ and back to CK. It is apparent that the "dip" CR or CR' is greater than CK but the manner in which the dips approach and recede from this value as the frequency is varied indicates that this is not an in phase condition. If the frequency is varied in either direction from that which gives the "dip" CR, a larger "dip" such as CT or CT', will be obtained, while varying the frequency in either direction from that which gives the "dip" CK will give a smaller "dip" such as CL. It may be seen that the "dip" CK corresponds to that obtained when the two currents in the coil are in phase as in Fig. 5, while the "dip" CR corresponds to the 180° out-of-phase conditions there shown; and the intermediate "dips" such as CQ indicate intermediate phase differences. Any frequency which gives a "dip" such as CK greater than the "dips" obtained with neighboring higher and lower frequencies, may therefore be considered as causing a 0° phase relationship between the primary and secondary coil currents, while any frequency which gives a "dip" such as CR' less than those obtained with neighboring higher and lower frequencies may be considered as causing the two currents to be 180° out of phase. Any frequency between these points will, of course, cause the two coil currents to be out of phase by amounts varying between 0° and 180°.

It will be noted that the "dip" CK passes quite close to the axis $O_x$ of the conductor, and that it intersects the vertical plane therethrough below the axis. This is characteristic of the "dips" obtained when the currents in the coil are in phase, and the maintenance of an in-phase condition therefore also insures the obtaining of "dip" readings which intersect or converge below the axis of the conductor and close to it rather than above it or above the surface of the earth, as in Figs. 18 and 17.

At the same time that the dip CK or CR' is obtained, it will be noted that the sharpest minimums will be obtained and as the dips recede from either of these values the minimums will become broader, all of which conforms to the principles illustrated in Figs. 5 and 6, so that the obtaining of sharp minimums gives a further or confirmatory indication of the in phase or 180° out of phase frequency.

Any "in phase" frequency determined by the above-described intermediate survey may be employed in making the final survey for accurate location of the conductor. In general, if a plurality of such frequencies are found, and if there is any difference in sharpness of minimums, or loudness of signals, obtained with different ones of these frequencies, I prefer to use that in phase frequency which gives the sharpest minimums and the loudest signals.

The determination of the "in phase" frequency is not highly critical, and the term "in phase" should be understood to mean substantially in phase, or a close enough approximation to an exact in phase relation to give sharp minimums and distortions in direction of "dip" from the vertical toward the axis of the conductor. In general, a determination to within about 10% of the frequency employed is sufficient for practical purposes.

After determining as above described a certain frequency of primary field at which the currents induced in the receiving coil by the primary and secondary fields are substantially in phase with one another, I then proceed to make the final survey for accurately determining the plan view location and depth of the conductor. Referring now to Fig. 21, the dotted line 100 represents the approximate plan view projection or profile of the axis of the underground conductor as determined by the preliminary survey above described. For making the final survey the transmitting loop 1 is set up at some suitable point along such line, for example, at or near one end thereof as shown at 1. A number of traverse lines 101 are then surveyed perpendicular to the line 100 and preferably at equal intervals lengthwise thereof. The distance between adjacent traverses will depend to some extent upon the indicated length of the axis of the conductor, and the probable depth thereof and upon the topography of the country, and may be for example 25 to 75 feet. Each of the traverses 101 may extend to any suitable distance either side of the line 100 depending upon the factors above mentioned, such distance being in general 15 to 50 feet. In general a distance should be provided between the loop 1 and the nearest traverse 101 which is at least equal to and preferably several times greater than the distance to which such traverse extends at either side of the line 100, so that when the loop is turned with its plane in the direction toward any set-up of the coil on said traverse, said plane of the loop will not deviate too greatly from the indicated plan view direction of the axis of the conductor.

A primary field, of the frequency determined by the intermediate survey above described as providing an in phase relationship between the two fields, is then set up about loop 1, and "dip" readings are made with coil 2 at a plurality of points 102 on each of the traverses 101. For making each of these "dip" readings the loop 1 is set in a vertical plane with its axis extending in the direction toward the receiving coil as indicated by the line 103. The horizontal axis of the coil 2 is maintained parallel to the horizontal projection of the axis of the unknown conductor as determined in the preliminary survey. With the loop and coil in these respective positions the coil is rotated about its horizontal axis and the "dip", or the direction perpendicular to the plane of the coil at the time of minimum signal intensity, is determined. The distances between the points 102 at which such "dip" readings are made will depend upon several factors, such as topography of the territory, probable or approximate depth of the conductor, relative strength of primary and secondary fields, and sharpness of minimums. These distances may, however, in general vary between 2 and 15 feet.

The reason for operating the loop with its plane in a direction toward the receiving coil, rather than exactly parallel to the indicated position of the axis of the underground body, is to ensure that the electromagnetic lines of force of the primary field, at the position of the coil, will be horizontal or tangent to the horizontal, regardless of the relative elevations of the loop and the coil. If the coil is very much higher or lower than the loop, as is frequently the case in mountainous or uneven country, and the loop is turned in any direction other than directly toward the coil, the electromagnetic lines of force of the primary field will not be tangent to the horizontal at the position of the coil. This is illustrated in Figs. 22 and 23, in which a loop 1 is shown in a vertical plane, Fig. 22 being a plan view and Fig. 23 an end view taken from the right in Fig. 22. The curved arrow 110 represents the direction of the electromagnetic lines of force in a region adjacent the plane of the loop, but somewhat higher than the loop. It is evident that the point 111 in the plane of the loop these lines of force are tangent to the horizontal as indicated by the arrow 112, while at any point not in the plane of the loop, such as 113, such lines of force are inclined to the horizontal as indicated by the arrow 114. It is evident that at any point in the horizontal plane of the center of the loop, the lines of force are always horizontal, as indicated by the arrow at 115.

As soon as any difference in elevation between loop and coil occurs, however, the above effect must be considered. In general it may be said that at any point in the vertical plane of the loop, the electromagnetic lines of force of the field produced by said loop are horizontal or tangent to the horizontal, while at any point not in the vertical plane of the loop, such lines of force are neither horizontal nor tangent to the horizontal, except at points in the horizontal plane through the center of the loop. Since the country in which mineral bodies occur is generally quite hilly or of irregular topography, and since the center of the loop and the center of the coil will therefore not generally lie in the same horizontal plane, I prefer in general to direct the plane of the loop toward the position of the coil in making all readings, and particularly in making the "dip" readings in the final survey.

In order to obtain indications as to the depth of the axis of the underground conductor, the "dips" obtained as above described on each of the traverses 101 are then plotted in profile view as shown for example in Fig. 24. The contour of the earth's surface may be plotted as at S—S and the "dip" readings obtained at each of the points 102 are then plotted as at 105, taking into consideration the HI distances, or the height of the center of the coil above the surface at each reading. In the case of deep conductors it is sufficiently accurate for practical purposes to assume an average HI distance in each case. The vertical "dip" 105', obtained at one of the points such as 102', indicates that the axis lies beneath this point, and it will be found in general that the "dip" 105 taken at points at equal distances either side of the point 102' will intersect one another approximately on the vertical line 105'. The position of the vertical "dip" between converging "dips", as thus determined, gives a more accurate indication as to the plan view location of the conductor, while the depths at which the "dips" converge furnish indications as to the depth thereof. The "dips" which give the closest indication of the depth are those taken immediately adjacent the vertical "dip" 105', for it has been found that the angle of distortion from the direction toward the axis of the conductive body is the least when the angle between a vertical line and the direction from the coil to the axis is the least. The electrical axis of the unknown conductor will in general be slightly above the intersections with the vertical of the two "dips" immediately adjacent to the vertical "dip", or in other words the depth of such axis will, in general, be approximately that depth which the depths of intersection of the "dips" with the vertical "dip" 105' appear to approach as a limit as such "dips" approach said vertical "dip." While the exact location may be determined by rather involved calculations taking into consideration the ratio of intensities of the primary and secondary fields at each position of the coil, such accuracy of calculation is not of sufficient value, in connection with the location of underground ore bodies as a basis for mining operations, to justify the time and cost expended upon it.

A simple approximate method of determining the depth of the axis of the conductor beneath each of the traverses 101 is also illustrated in Fig. 24. As abscissae are plotted the horizontal distances of the points 102 from the point 102' of Fig. 22, while as ordinates are plotted, for each of such points, the depths at which the respective "dip" lines 105 intersect the vertical line 105'. Curves may then be drawn through the points 107 obtained in this manner and the point 107' at which these curves intersect the vertical 105' indicates, with sufficient accuracy for all practical purposes, the depth of the axis of the underground conductor.

Throughout the foregoing description the transmitting loop has been described as being operated with its plane vertical, so that the magnetic lines of force of the primary field extend horizontally at the position of the direction-finding coil, when the loop is turned so as to keep the coil in its plane. It is evident, however, that the process is not limited to operation in this manner, but that the loop may be operated in any known plane, provided such plane passes through or approximately through the direction-finding coil. For example as illustrated in Fig. 25, if it is desired to locate an ore body or other conductor X' within a steep hill or bluff indicated at S'—S', the loop may be set in some plane other than vertical, for example, as indicated at 1', in a plane substantially perpendicular to the inclination of the surface, in which event the magnetic lines of force of the primary field, at points in the plane of the loop, will extend substantially parallel to the surface as indicated by the straight arrow, while the presence of the conductor will be indicated by the effect on the coil of the magnetic lines of force of the secondary field as indicated by the curved arrow. Under these conditions, "strikes" and "dips" may be determined substantially as above described, with the exception that an inclined plane having the average inclination of the hill may more advantageously be used as a reference plane, and the "dip" angles may be determined with respect to a direction normal to this reference plane rather than with respect to the vertical. In this manner, the location and the distance of the conductor from the surface may be determined as before, the "dip" readings so obtained converging beneath the axis $O_x'$ of the conductor and upon a line passing therethrough and normal to said reference plane, as indicated in Fig. 26.

One purpose of mounting the loop so that it may be rotated about a horizontal axis as well as about a vertical axis is to permit it to be turned to planes other than vertical for operation in the manner just described.

I claim:

1. The method of locating conductive bodies within a mass of less conductive material which comprises setting up a primary high frequency electromagnetic field within said less conductive mass by means of a transmitting loop entirely independent of said less conductive mass, so as to cause alternating current of such frequency to be induced in a conductive body within such field and thereby produce a secondary electromagnetic field of such frequency about the axis of said conductive body, and then determining the resultant effects of the primary and secondary fields upon a direction-finding coil, at a plurality of points within both of said fields and spaced from the transmitting loop, and calculating the location of the axis of said conductive body from the effects so determined, the plane of the transmitting loop being maintained vertical and being directed toward the direction-finding coil at each position at which such coil is used.

2. The method of locating conductive bodies which comprises first detecting the presence and determining the approximate plan view location of such a body by electromagnetic methods employing a transmitting loop and a direction-finding coil, then determining the frequency at which the primary field set up by the transmitting loop and the secondary field about the conductive body are substantially in time phase with one another at the position of the coil, and then accurately determining the plan view location and the depth of said conductive body by means of electromagnetic methods employing a transmitting loop and a direction-finding coil and using an electromagnetic field of substantially the frequency so determined.

3. The method of locating conductive bodies which comprises first determining the approximate location of the electrical axis of such a body by electromagnetic methods, and then setting up a primary high frequency electromagnetic field about a transmitting loop whose plane is directed substantially toward the location of the axis as so determined, so as to cause a maximum induction of high frequency current in such body, and then obtaining indications as to the exact location of said body by means of measurements, at a plurality of points at either side of such approximate location of said axis, dependent upon the direction of the secondary electromagnetic field set up about said body by the current so induced therein.

4. The method of determining the depth of the electrical axis of an underground conductor whose approximate plan view location is already known, which comprises setting up a primary high frequency electromagnetic field about a transmitting loop located at a point substantially directly above said conductor and having its plane vertical and substantially in the horizontal direction of such conductor so as to induce high frequency current to flow in said conductor and hence create a secondary high frequency electromagnetic field surrounding the electrical axis thereof, then setting up a direction-finding coil successively at a plurality of points above said axis and at known distances to either side thereof and spaced from the loop longitudinally of said axis, and then, at each of said points, rotating the receiving coil about a horizontal axis extending approximately parallel to the plan view location of the axis of the conductor, and determining the vertical angle of the plane of the coil at the position of maximum resultant current induction therein, and determining the depth of said axis by calculating the depths at which the angles so determined intersect the vertical passed through the axis of the conductor and the depth which the depths so calculated appear to approach as a limit as the angles so determined approach the vertical.

5. In methods of locating unknown conductive bodies by means of a direction-finding coil in a primary electromagnetic field of known direction and frequency, the location of an unknown conductive body being indicated by the effect on said coil of the secondary electromagnetic field surrounding said body under these conditions, the step of determining the frequency of primary field at which the primary and secondary fields are substantially in phase with each other at the position of the coil, which comprises varying the frequency of the primary field and noting the extent to which the plane of the direction-finding coil, at the time of maximum current induction therein by the primary and secondary fields combined, is distorted from the position which it would have if influenced by the primary field alone, and determining a frequency of primary field at which such distortion reaches a maximum greater than the distortion obtained with a primary field of higher or lower neighboring frequencies.

6. In electromagnetic methods for accurately determining the location of a conductive body whose approximate plan view location is known, the steps which comprise setting up a primary electromagnetic field about a transmitting loop located approximately above said conductive body, maintaining the plane of the loop vertical and in the same general plan view direction as the conductive body so as to cause an alternating current therein and hence create a secondary electromagnetic field about said conductive body, setting up a direction-finding coil at a point somewhat to one side of said conductive body and spaced from the loop longitudinally of said conductive body, varying the frequency of the primary field and noting the extent to which the plane of the coil, at the time of maximum current induction therein by the primary and secondary fields combined, is distorted from the vertical, noting a frequency of primary field at which such distortion reaches a maximum greater than that obtained with neighboring higher or lower frequencies, and utilizing a primary field of the frequency so determined for the purpose of more accurately determining the location of the conductive body.

7. The method of determining the depth of the electrical axis of an underground conductor whose approximate plan view location is already known which comprises setting up a primary high frequency electromagnetic field about a transmitting loop located at a point above said conductor and having its plane vertical so as to induce high frequency current to flow in said conductor and hence create a secondary high frequency electromagnetic field surrounding the electrical axis thereof, then setting up a direction-finding coil successively at a plurality of points above said axis and at known distances to either side thereof and spaced from the loop longitudinally of said axis, and then, at each of said points, rotating the receiving coil about a horizontal axis extending approximately parallel to the plan view location of the axis of the conductor, and determining the vertical angle of the plane of the coil at the position of maximum resultant current induction therein, and finally determining the depth of said axis by calculating the depth at which the angles so determined intersect the vertical passed through the conductor, the plane of the loop being turned toward the position of the receiving coil at each point at which readings are taken therewith so as to insure that the magnetic lines of force of the primary field extend horizontally at the position of the coil, the coil being at all times spaced sufficiently from the loop longitudinally of the axis of the conductor so that the plane of the loop when so turned will still approximate a parallel relation to said axis sufficiently to cause a secondary field to be maintained of sufficient intensity for accurate results to be obtained.

8. The method of detecting the presence and determining the general location of conductive bodies within a mass of less conductive material which comprises setting up a primary high frequency electromagnetic field about a transmitting loop entirely independent of said mass of less conductive material, so as to cause induced current to flow in a conductive body within said mass, accompanied by a secondary electromagnetic field surrounding said conductive body, and operating a direction-finding coil at spaced points removed from the transmitting loop in said primary field while so positioning the transmitting loop with respect to the direction-finding coil as to maintain the lines of force of the primary field substantially horizontal at each position at which the direction-finding coil is so operated, said direction-finding coil being rotated at each of said points first about a vertical axis to determine the plane of maximum current induction therein and then about a horizontal axis lying in the plane so determined, so as to indicate the presence of inclined lines of force of said secondary electromagnetic field.

9. The method of determining the exact location of an underground conductor whose approximate plan view location is known, which comprises setting up a primary high frequency electromagnetic field about a transmitting loop located substantially above said conductor and with the plane of the loop vertical and substantially parallel to the longitudinal axis of the underground conductor, so as to cause induced current to flow in said conductor and hence create a secondary high frequency electromagnetic field surrounding said conductor, and then determining the resultant effects of the primary and secondary fields upon a direction-finding coil, at a plurality of points within both of said fields and spaced from the transmitting loop longitudinally of the conductor, and calculating the location of the axis of said conductor by means of such determinations.

10. The method as set forth in claim 9, the plane of the transmitting loop being directed toward each point at which determinations are made with the direction-finding coil, said points being sufficiently remote from the transmitting loop in proportion to the distance thereof from the plan view location of the conductor so that the transmitting loop when turned directly toward said points is still approximately parallel to the conductor.

11. The method of determining the exact location of an underground conductor whose approximate plan view location is known, which comprises setting up a primary high frequency electromagnetic field about a transmitting loop whose plane is directed toward the approximate location of said conductor and substantially parallel to the plan view direction thereof so as to cause induced current to flow in said conductor and hence create a secondary high frequency electromagnetic field surrounding said conductor, and then determining the resultant effects of the primary and secondary fields upon a direction-finding coil, at a plurality of points within both of said fields and spaced from the transmitting loop longitudinally of the conductor, and calculating the location of the axis of said conductor by means of such determinations.

In witness that I claim the foregoing I have hereunto subscribed my name this 25th day of March, 1927.

EDWARD H. GUILFORD.